(12) United States Patent
Higuchi et al.

(10) Patent No.: US 6,275,572 B1
(45) Date of Patent: Aug. 14, 2001

(54) CONGESTION CONTROL METHOD AND SYSTEM IN AN EXCHANGE

(75) Inventors: Mamoru Higuchi; Satoshi Murata, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,945

(22) Filed: Oct. 13, 1998

(30) Foreign Application Priority Data

Mar. 10, 1998 (JP) .................................................. 10-057595

(51) Int. Cl.[7] .......................... H04M 15/00; H04M 3/00; H04M 7/00
(52) U.S. Cl. ......................... 379/111; 379/133; 379/196; 379/230; 455/453
(58) Field of Search ..................... 379/111, 112, 379/113, 115, 133, 134, 138, 139, 141, 207, 229, 230, 196, 197, 198; 370/229, 235, 238; 445/453

(56) References Cited

U.S. PATENT DOCUMENTS

| | | | | |
|---|---|---|---|---|
| 5,291,550 | * | 3/1994 | Levy et al. | 379/242 |
| 5,291,552 | * | 3/1994 | Kerrigan et al. | 379/266 |
| 5,400,329 | * | 3/1995 | Tokura et al. | 370/84 |
| 5,457,687 | * | 10/1995 | Newman | 370/85.3 |
| 5,583,792 | * | 12/1996 | Li et al. | 364/514 |
| 5,778,057 | * | 7/1998 | Atai | 379/220 |
| 5,822,401 | * | 10/1998 | Cave et al. | 379/34 |
| 5,933,481 | * | 8/1999 | MacDonald | 379/137 |
| 6,011,838 | * | 1/2000 | Cox | 379/113 |

FOREIGN PATENT DOCUMENTS

| | | |
|---|---|---|
| 59-4258 | 1/1984 | (JP) . |
| 59-25459 | 2/1984 | (JP) . |
| 58-40957 | 3/1998 | (JP) . |

* cited by examiner

Primary Examiner—Curtis Kuntz
Assistant Examiner—Binh K. Tieu
(74) Attorney, Agent, or Firm—Helfgott & Karas, P.C.

(57) ABSTRACT

The present invention is provided to improve congestion control without changing a quality of a connection service of communications even if congestion occurs and realize a flexible correspondence. The congestion control method, comprising the steps of generating a call pattern as time series data of calls from a subscriber, performing Fast Fourier transformation on the time series data of the calls to detect short periodic component of a frequency, delaying the detected short periodical component with a prescribed threshold, and delaying a timing of sending a congestion tone (CT) or busy tone (BT) when the value of the short periodical component exceeds the prescribed threshold.

32 Claims, 18 Drawing Sheets

Countering-Process

S: incoming interval
P: threshold of the incoming interval

FIG. 12

DN=132-313-0142
    -312-0015     } 310 ~ 319 ⟶ Group A
    -318-3489
    . . .

DN=266-088-3178
    -084-4457
    -087-3658     } 080 ~ 089 ⟶ Group B
    -087-3658
    . . .

FIG. 13

Subscribers in a fixed network
  Figures of DN  03, 044, 0298 ⟶ Group A

Subscribers in a movable network
  Figures of DN  030, 040, 080 ⟶ Group B

Subscribers for WLL
  Figures of DN  039, 049, 089 ⟶ Group C

Busy or call-congestion status

CONGESTION CONTROL METHOD AND SYSTEM IN AN EXCHANGE

BACKGROUND OF THE INVENTION

1. Field of the Invention

The present invention relates to congestion control method and system in an exchange.

2. Description of the Related Art

FIG. 15 shows a normal status in case that is accommodated in a general exchange 1. As shown in FIG. 15, in this case, the calling subscriber can talk with a desired subscriber if a trunk 3 on an output side of the exchange 1 is idle and the desired subscriber is not talking.

FIG. 16 shows a busy or congested status in the above-described case. If the trunk 3 is not idle because of call congestion, or a desired subscriber's phone is busy, as shown in FIG. 16, a congestion tone (CT) or busy tone (BT) is transmitted to the calling subscriber, and then, the calling subscriber can hear the tone.

In here, a flow chart for connecting a BT/CT is shown in FIG. 17. As shown in FIG. 17, if a calling is incoming (STEP S2) when a trunk 3 is in an idle status (STEP S1), an exchange 1 receives a telephone number of the calling subscriber (STEP S3). Then, the exchange 1 judges whether or not there is an idle trunk 3 on its output side (STEP S4).

If there is an idle trunk 3, channel connection can be performed. If not, the exchange 1 connects with a BT/CT transmitter 4 to send a congestion tone (CT) or busy tone (BT) to the calling subscriber.

In here, call congestion may be caused by that many subscribers try to send callings at the same time, and as shown in FIG. 18, repeat hanging and calling without waiting after they hear a congestion tone or busy tone (BT). Therefore, this situation makes the call congestion status be aggravated more, thus it becomes hard to connect with a desired subscriber.

It is a matter of frequent occurrence to experience a similar situation such that it becomes hard to connect to a specific line because many subscribers concurrently call one line up, especially in an emergency. The reason is because most of the subscribers repeat the above-described situation of FIG. 18.

In such a situation, a congestion can be relieved by controlling the incoming to enable connection in order to solve the above-described problem till now. In the conventional method, a subscriber can not be connected to a specific channel, temporarily, and the specific channel is compulsorily made to an idle status to prevent from congestion.

However, in this method, congestion occurs again right away, in other words, a vicious cycle is repeated. Thereby, a quality of call connection service becomes lower. This means the conventional method is not preferable.

SUMMARY OF THE INVENTION

Accordingly, it is an object of the present invention to provide a congestion control method and system so as to maintain a quality of a call connection service, similarly in a normal status, even on encountering congestion and to flexibly relieve the congestion.

To achieve the aforementioned object, a first basic structure of the present invention includes the steps of generating a call pattern as time series data of calls from a subscriber, performing Fast Fourier transformation on the time series data of the calls to detect short periodic component of a frequency, comparing a number of the detected short periodical component with a prescribed threshold, and delaying a timing of sending a congestion tone (CT) or busy tone (BT) when the value of the short periodical component exceeds the prescribed threshold.

Further, to achieve the aforementioned object, a second basic structure of the present invention includes the steps of counting calls from subscribers in each prescribed channels, obtaining an amount of calls in certain interval from the counted number of the calls, and delaying a timing of sending a congestion tone (CT) or busy tone (BT) when the amount of calls in certain interval exceeds a predetermined threshold.

In one detailed mode on the above-described structure, subscribers are grouped according to a prescribed standard for changing and controlling so as to delay a timing of sending a congestion tone (CT) or busy tone (BT) in every grouped group.

Alternatively, subscribers are grouped according to a prescribed standard for changing and controlling so as to delay a timing of sending a congestion tone (CT) or busy tone (BT) to a subscriber joined in a specific one of the grouped groups.

Further, as a detailed method for grouping, the grouping is performed by transforming subscriber numbers into a hash function.

Alternatively, the grouping is performed according to a terminal number of the subscriber number. Additionally as the other method, the grouping is performed according to an attribute of the subscriber number.

Furthermore, an exchange system employing a common channel No. 7 signaling method includes a common channel signaling equipment including buffers, a network layer for detecting a congestion status when the levels of the buffers exceed a prescribed threshold and an application layer for delaying a timing of sending a congestion tone (CT) or busy tone (BT) when detecting a congestion status in the network layer.

As described above, the congestion can be prevented from repeating to send callings in a short time by controlling so as to delay a timing of sending a congestion tone (CT) or busy tone (BT) in a congestion status. Thereby, the congestion status can be relieved.

Further, other objects of the present invention become clear by the description for explaining embodiments according to the attached drawings.

BRIEF DESCRIPTION OF THE DRAWINGS

FIG. 12 is a detailed example of grouping by using the third figure (terminal number) in a subscribers' dial digit.

FIG. 13 is an example for grouping based on an attribute of a subscriber terminal.

DESCRIPTION OF THE PREFERRED EMBODIMENTS

Figure 1:
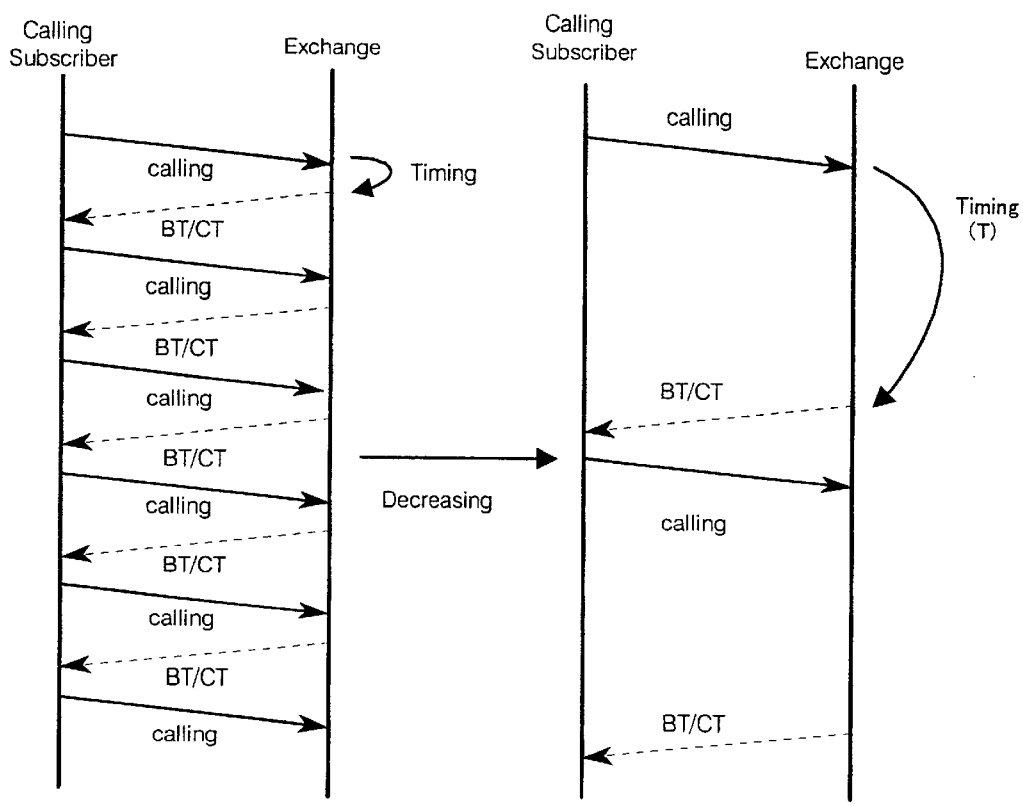
FIGS. 1A and 1B are principal diagrams of the present invention.

Embodiments according to the present invention will be now explained in accompanying with the attached drawings. Throughout the following descriptions, the same reference numerals and symbols are used to denote and identify corresponding or identical components.

Figure 18:
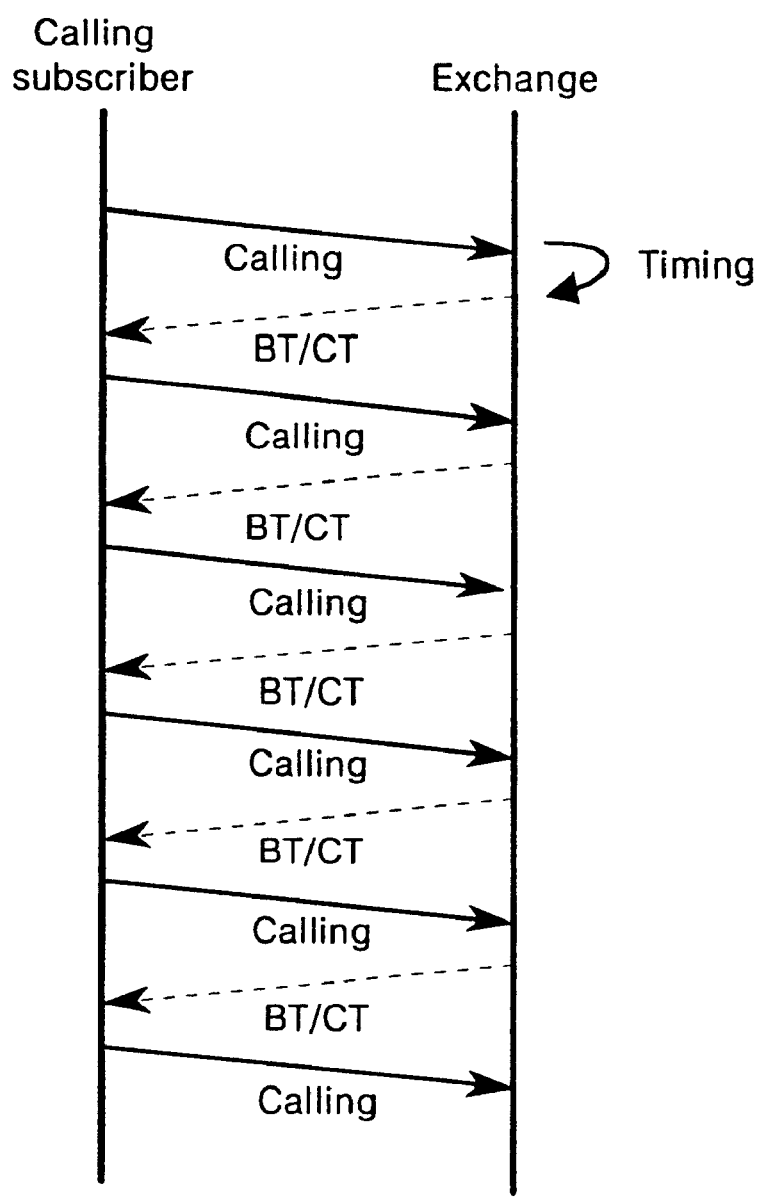
FIG. 18 is a diagram for explaining a problem that repetition of incoming call and BT/CT connection in FIG. 16.

FIGS. 1A and 1B show an outline of the present invention. In FIG. 1A, a situation of repeating incoming a call and transmitting a BT/CT is shown, similarly to that of FIG. 18. It is a feature of the present invention to change a process so as to make a timing T from calling to sending a BT/CT longer when the situation shown in FIG. 1A occurs, as shown in FIG. 1B.

When controlling the timing T in this way, a rate of incoming calls in certain interval can be reduced than that in the situation of FIG. 1A. Thereby, congestion can be relieved and a possibility for connecting to the desired channel becomes higher. An opportunity for changing timing T should be considered in here.

Accordingly, the feature of the present invention is to provide a method and system for changing the timing T from calling to transmitting a BT/CT, based on the characteristic that most subscribers tend to repeat callings in a short time when congestion occurs. It becomes possible to reduce a rate of callings in certain interval by changing the timing T till sending a BT/CT in this way.

Figure 2:
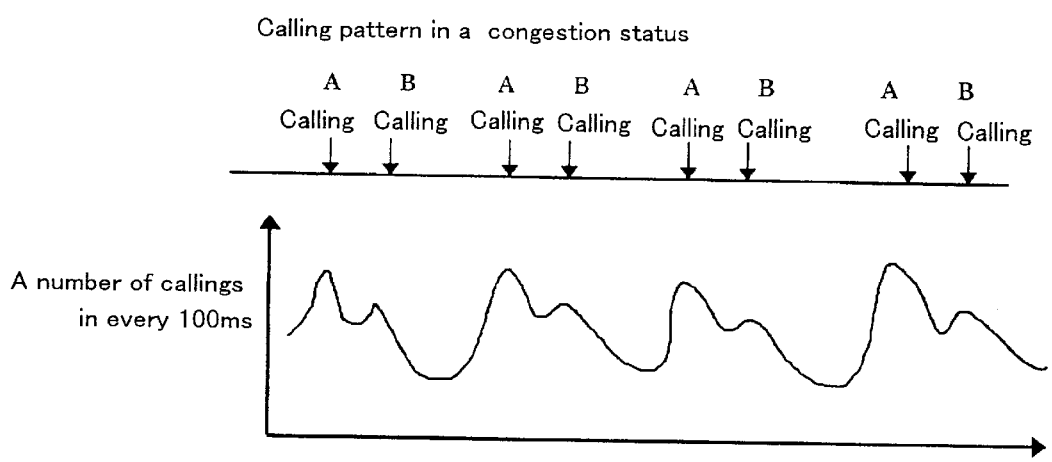
FIG. 2 shows one example of an incoming call pattern on call congestion.

FIG. 2 shows one example of a calling pattern when congestion occurs. It shows a number of incoming calls in every 100 ms become a pattern of repeating in a short period. Therefore, in the present invention, the short periodicity of the calling pattern is detected and controlled as an opportunity for changing the timing T from calling to sending a busy tone BT.

The following methods can be respectively used as methods of detecting the short periodicity:

The first method is to obtain a Fourier frequency by Fourier-transforming time series data shown in FIG. 2. In other words, the result of the Fourier-transformation can be expressed as the following equation:

$$S(t) = \int s(t) e^{-j2\pi f t} dt \qquad (1)$$

where s(t) is an optional continuous waveform, S(t) is obtained by Fourier-transforming s(t), j is an imaginary number, and an integration range is between $-\infty$ and $+\infty$.

On the contrary, the second method is to obtain the result by discrete Fourier-transformation in an arithmetic processor. The result can be expressed as:

$$S(fk) = \Sigma s(t) e^{-j2\pi f(k)r(i)}(t_{i+1} - t_i) \qquad (2)$$

where K=0, 1, . . . N−1 and a range of the sum total is between 0 to N−1.

This method of Fourier-transformation according to the equation (2) is effective when it is impossible to mathematically integrate. However, it was a fault to take much time for calculation because a number of calculations is proportion to two powers of N, which is data of s(t) in the above-described method.

The method is improved by adding a calculation algorithm where the number of calculations is proportion to N log 2N. Hereinafter, the improved method is called fast Fourier transformation (FFT) method.

In the present invention, this FFT program is included inside of an exchange 1, as one embodiment.

Figure 3:
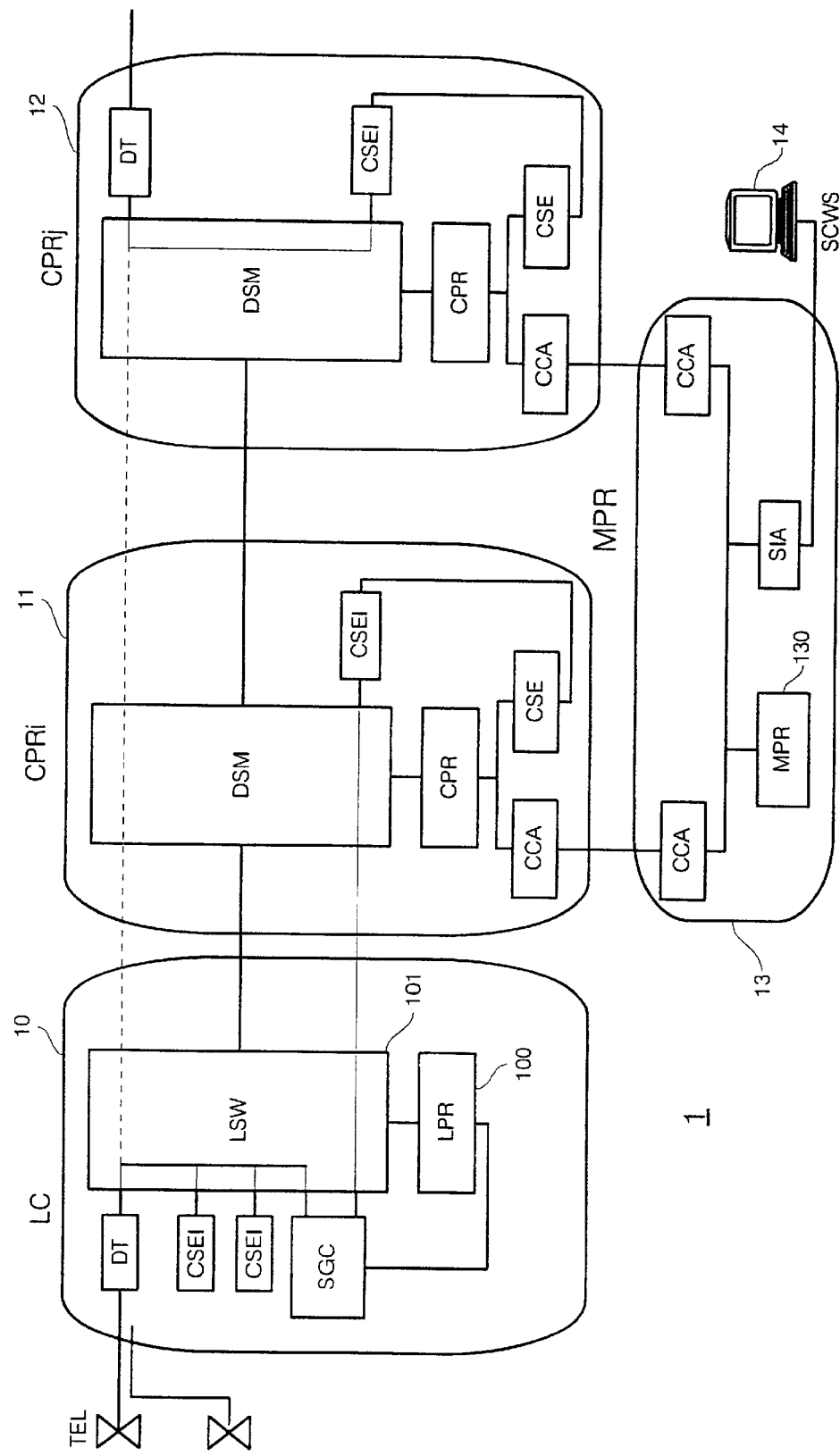
FIG. 3 is a structural block diagram of an exchange.

FIG. 3 shows a structural block diagram of an exchange 1. The exchange 1 includes a line controller 10, switching sections 11 and 12, and a main controller 13. The line controller 10 including a line switch 101 controlled by a line processor 100 stores telephones of plural subscribers.

The line controller 10 transmits and receives control data to and from the main controller 13 through a common channel. A control instruction sent by a maintenance operator through a system controller 14 is given to the main controller 13, and the controller 13 informs control information to the system controller 14.

In the structure of the exchange, program and data for controlling to execute the method according to the present invention are stored in a memory area of the line processor 100 of the line controller 10.

In other words, the FFT program described above is also stored in the memory area, and the program is executed by the main processor 130 and the line processor 100.

Figure 4A:
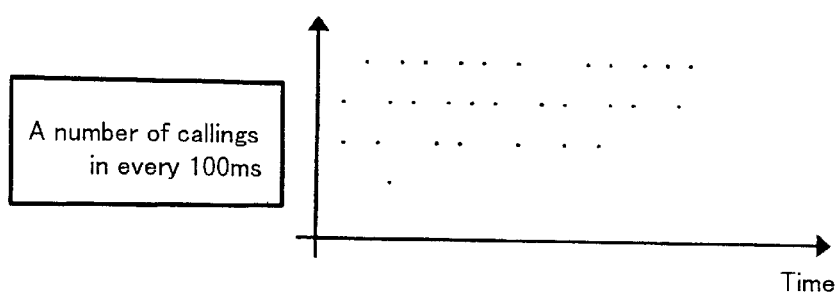
FIGS. 4A and 4B are graphs illustrating a number of incoming calls in every 100 ms.
Figure 4B:
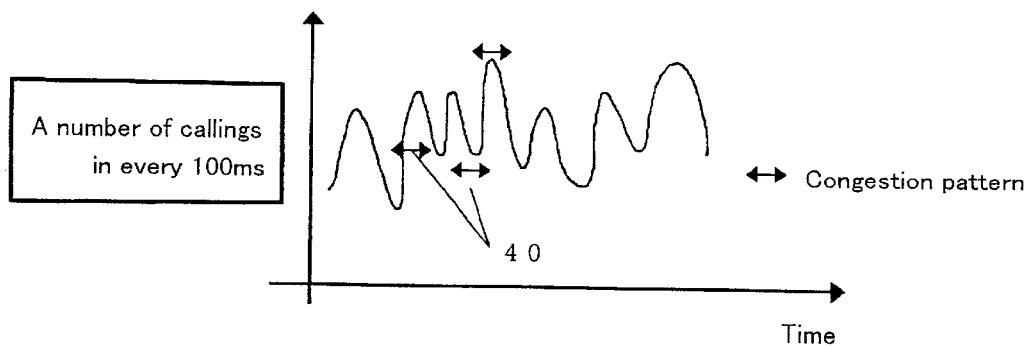

FIGS. 4A and 4B are graphs of the numbers of incoming calls in every 100 ms. In FIG. 4A, a number of callings in every 100 ms is plotted by illustrating the number and time respectively in axes of ordinate and abscissa.

In FIG. 4B, a waveform when executing fast Fourier-transformation according to the FFT program based on the number of incoming calls shown in FIG. 4A is shown. In FIG. 4B, congestion patterns 40 are shown, in which a peak of the incoming calls appears when executing fast Fourier-transformation.

Figure 5:
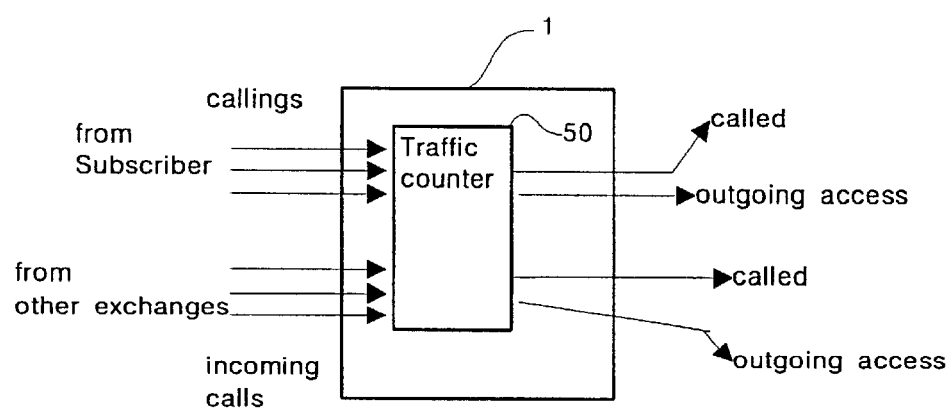
FIG. 5 explains a structure for fining a number of incoming calls in every 100 ms shown in a first embodiment of FIG. 4A.

FIG. 5 is an explanatory diagram of a structure for obtaining a number of incoming calls in every 100 ms shown in FIG. 4A. In FIG. 5, an exchange 1 includes a traffic counter 50 to count callings from subscribers stored in the exchange 1 and incoming calls from the other exchanges.

The counter 50 is located on a memory of the line processor 100 of the line controller 10 illustrated in FIG. 3. Then, callings from the subscribers stored in the exchange 1 and incoming calls from the other exchanges are concentrated to a traffic counter 50 on the memory according to a traffic collection program.

Figure 6:
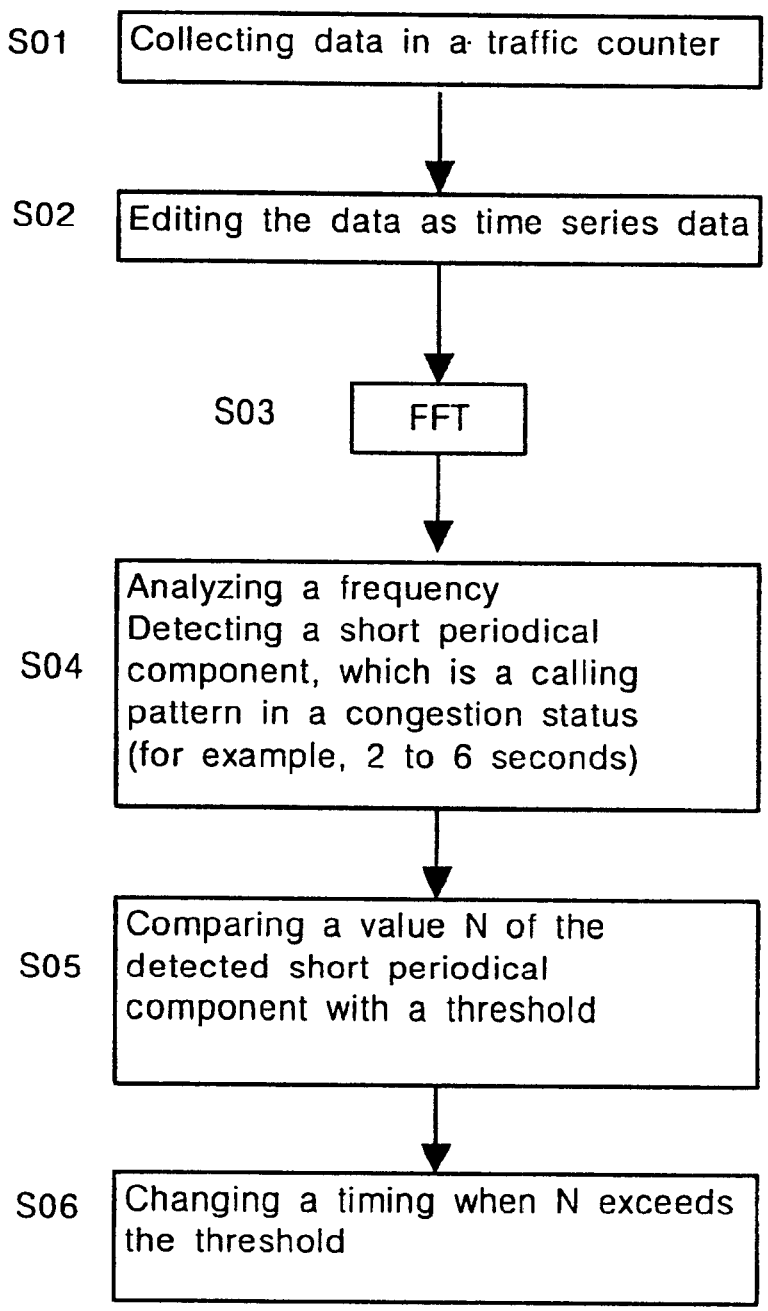
FIG. 6 shows a flow chart for explaining a call congestion control process when employing FFT according to a first embodiment of the present invention.

FIG. 6 is an explanatory diagram of a congestion control process when employing FFT according to a first embodiment of the present invention. As explained above, the processing flow of FIG. 6 is controlled by a program stored in a main processor 130 and line processor 100.

As explained in accompanying to FIG. 5, data stored in the traffic counter 50 is periodically collected in every 100 ms as one embodiment (STEP S01). The collected data is edited as time series data (STEP S02).

Then, fast Fourier transformation (FFT) process is executed to the edited data (STEP S03). A short periodical component 40, which is a calling pattern on congestion as shown in FIG. 4B, is obtained from the result of the fast Fourier transformation. In this embodiment, the short periodical component 40 is between 2 and 6 seconds.

Then, a number N of callings in the detected short periodical component is compared with a threshold (STEP S05) On this comparison, when the number N in the short periodical component exceeds than the threshold, it is controlled so as to delay a timing for sending a BT/CT (STEP S06).

Next, a method for storing incoming time will be now explained as the second method according to the present invention.

Figure 7:
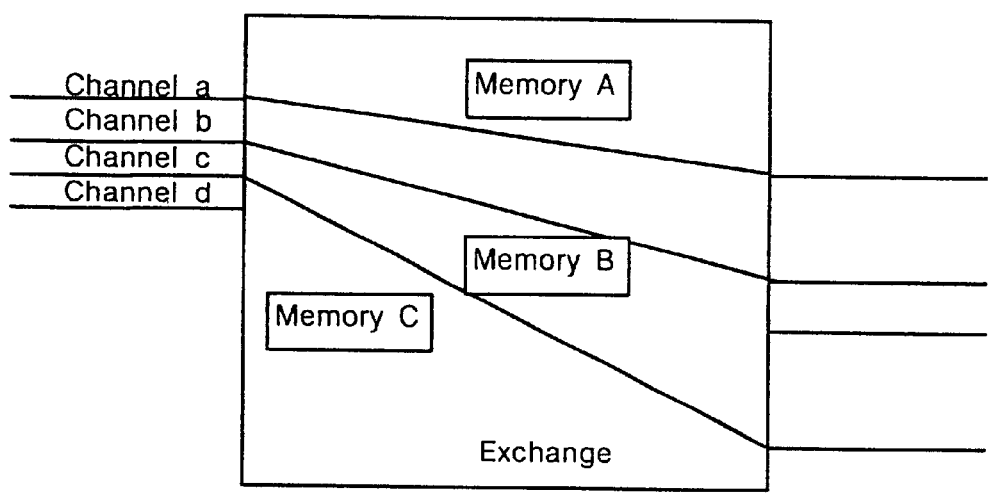
FIG. 7 explains a basic structure of a second embodiment of the present invention, and further explains a line and an incoming time storage memory.
Figure 8:
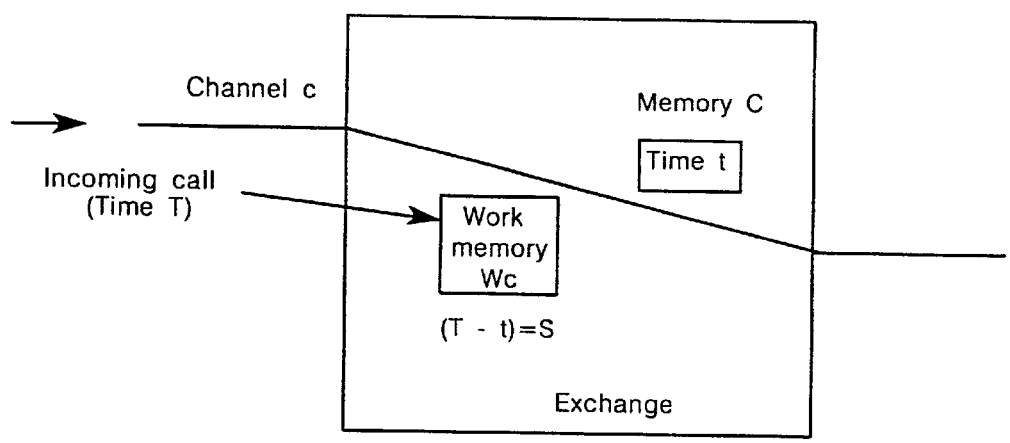
FIG. 8 explains a basic structure of a second embodiment of the present invention, and further explains a calculation of an incoming interval.

FIGS. 7 and 8 are explanatory diagrams of a basic structure of the second method. In FIG. 7, a memory area to record incoming times, provided for each channel. In FIG. 7, incoming time storage memories A, B, C . . . are respectively provided for channels a, b, c, . . .

The incoming time storage memories A, B, C . . . are set on a memory area of a line processor 100. FIG. 8 is an explanatory diagram of an example for calculating an incoming interval by using incoming time storage memories A, B, C, . . .

A case where a call is income to a channel c at a time T will be now considered. The incoming time is stored in a work memory Wc, which is individually provided from the incoming time storage memories A, B, C, . . . As shown in FIG. 8, a difference between the incoming call and a time t stored in the incoming time storage memory C corresponding to the channel c is obtained: this can be expressed as: $S=(T-t)$.

Figure 9:
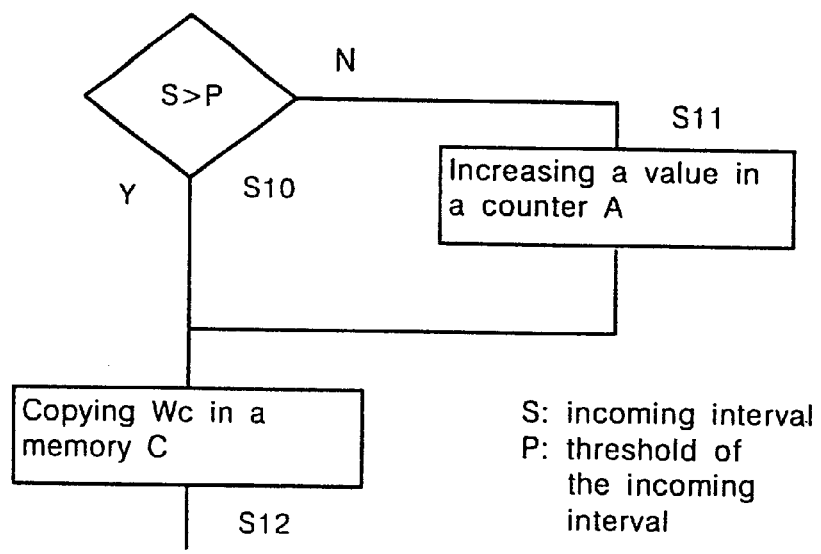
FIG. 9 is an operational flow chart of a counter processing procedure in a second embodiment of the present invention.

Then, in the flow chart shown in FIG. 9, the obtained difference S is smaller than a prescribed threshold P (STEP S10), a value of a counter A in a memory area of an exchange 1 increases only one (STEP S11), and the value in the work memory Wc shown in FIG. 8 is copied to the incoming time storage memory C corresponding to the channel c.

The value S showing an incoming interval is larger than the threshold P, the value in the work memory Wc is copied to the incoming time storage memory C (STEP S12).

Figure 10:
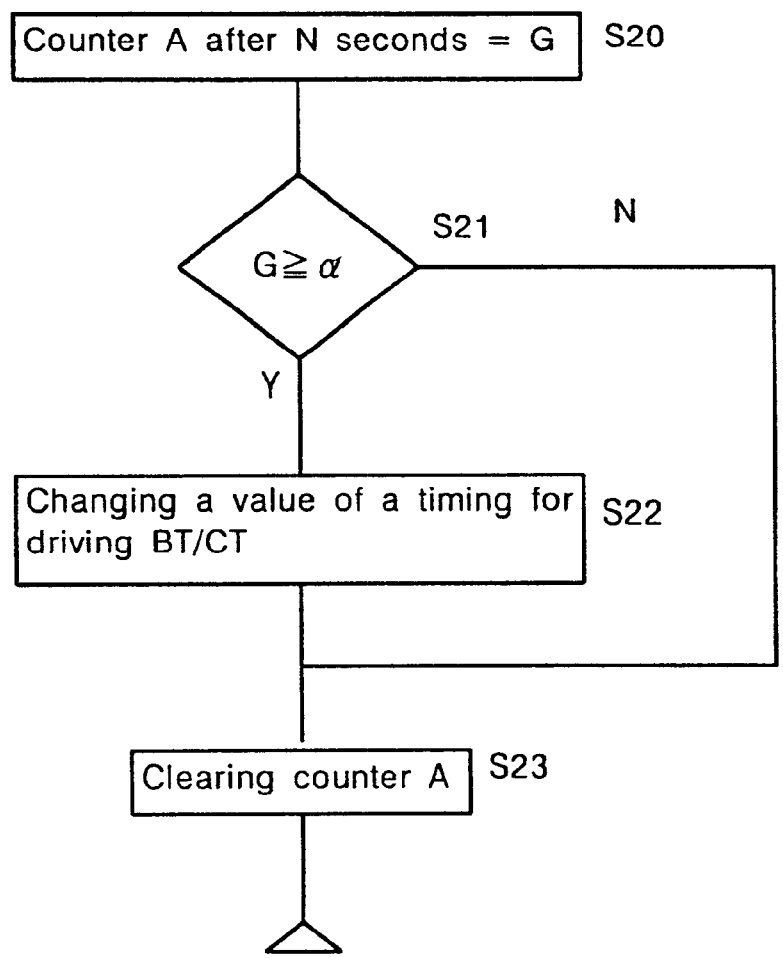
FIG. 10 is an operational flow chart for explaining a BT/CT timing change processing procedure in a second embodiment of the present invention.

Then, according to the flow chart of FIG. 10, a process for changing a BT/CT timing is executed. In FIG. 10, a value (G) in the counter A after elapsing N seconds is obtained (STEP S20), and it is judged whether or not the value G exceeds a threshold α (STEP S21).

If the value G does not exceed the threshold α in the counter A, the counter A is cleared (STEP S23), and this process is returned to the step S10 of FIG. 9, again. On the other hand, if the value G in the counter A exceeds the threshold α, a process for changing a BT/CT timing is executed (STEP S22). Then, the counter A is cleared (STEP S23).

An embodiment improved from the second method according to the present invention, which is explained in accompanying to FIGS. 9 and 10 will be now explained.

In the second method explained in FIGS. 9 and 10, a counter is provided in each channel. However, it is possible to perform effective call congestion control by grouping subscribers.

In a first grouping method, subscriber numbers (DN) are grouped by a hash function.

The hash function is to number a key of the given data and correspond the numbered key to either addresses (groups) within a predetermined range. Therefore, when grouping multiple data by using the hash function, it is required that the data is randomly distributed in correspondence to the address.

Figure 11:
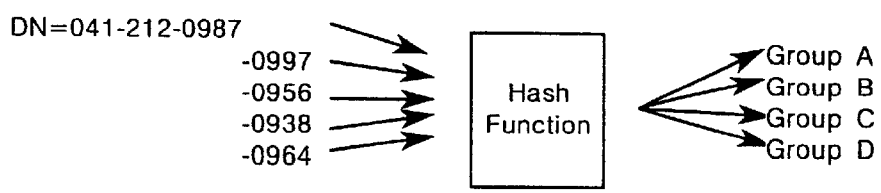
FIG. 11 is an explanatory diagram for grouping subscriber numbers (DN) by using hush functions.

FIG. 11 is an explanatory diagram of grouping subscriber numbers (DN) by employing the hash function. In FIG. 11, the plural randomly distributed subscriber numbers (DN) are arithmetized by the hash function to group to each groups A, B, C and D.

A counter is provided in each of the groups to control and change a BT/CT signal transmission timing according the process explained in FIGS. 9 and 10.

Further, it is also possible to group the subscriber numbers aiming at three figures (terminal number) in a digital digit of a subscriber as the other method.

As one embodiment of the present invention, terminal numbers 310 to 319 are grouped to a group A and terminal numbers 080 to 089 are grouped to a group B in the example of FIG. 12. In this way, a counter is provided in each of the grouped groups to change the BT/CT signal transmission timing according to the process shown in FIGS. 9 and 10.

More particularly, it is also possible to differ the value for changing and controlling the BT/CT signal transmission timing of the grouped terminal number group from the other group.

Further, grouping can be performed in each attribute of a subscriber terminal, for example, subscribers for a fixed network, subscribers for a movable network, or subscribers for wireless local loop (WLL). FIG. 13 shows an example of grouping based on an attribute of a subscriber terminal.

When grouping the subscriber terminals, as described above, it is also possible to differ the threshold for changing and controlling the BT/CT signal transmission timing in each group or change and control the BT/CT signal transmission timing in each group with respect to only a specific group.

Figure 14A:
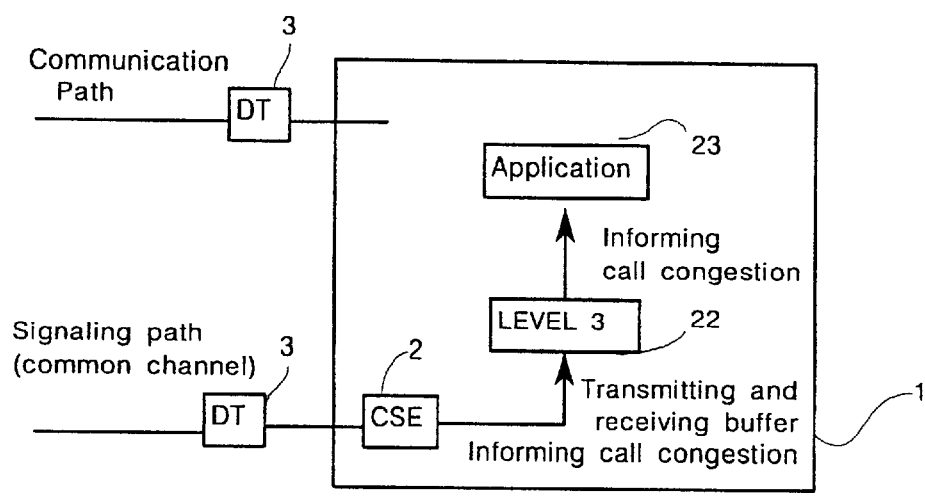
FIG. 14 is an explanatory diagram of the other embodiment for changing and controlling a BT/CT signal transmitting timing.
Figure 14B:
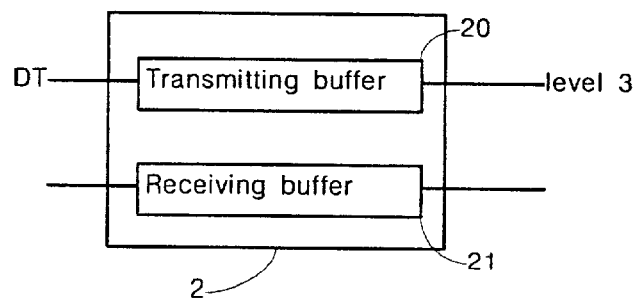
Figure 15:
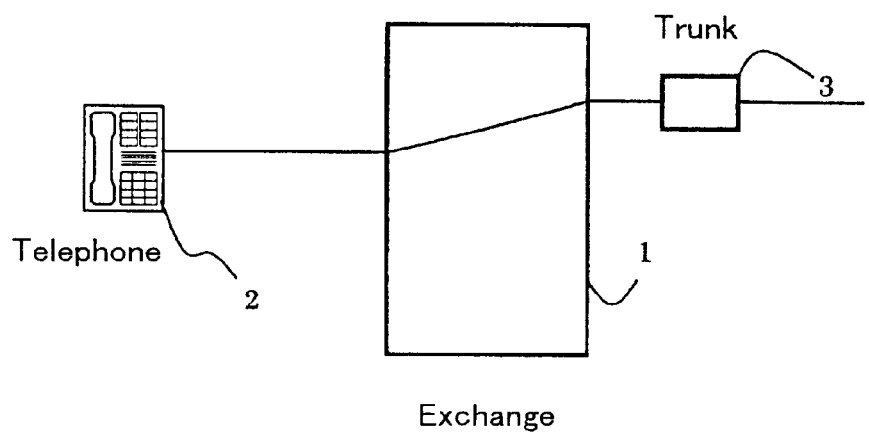
FIG. 15 is an explanatory diagram of a normal status when dialing from a subscriber phone stored in a general exchange to a desired subscribers' phone.
Figure 16:
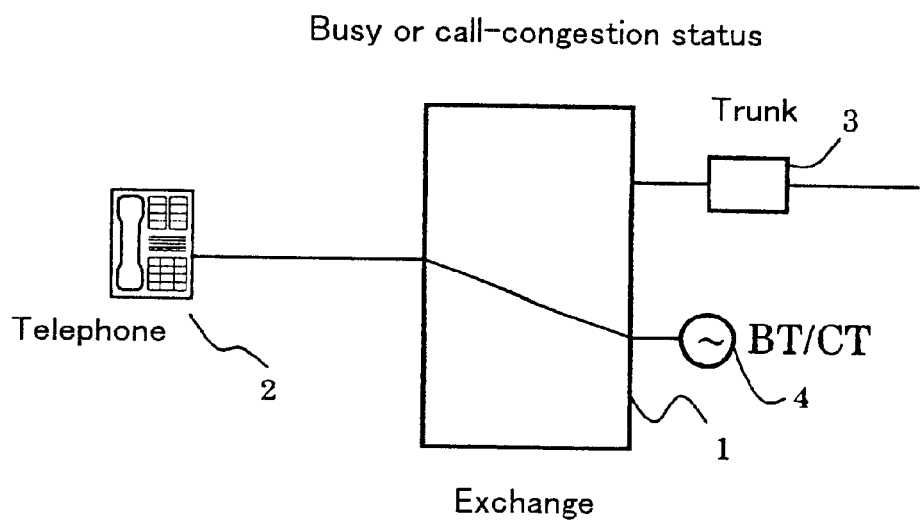
FIG. 16 is an explanatory diagram of a call congestion status when dialing from a subscriber phone stored in a general exchange to a desired subscribers' phone.
Figure 17:
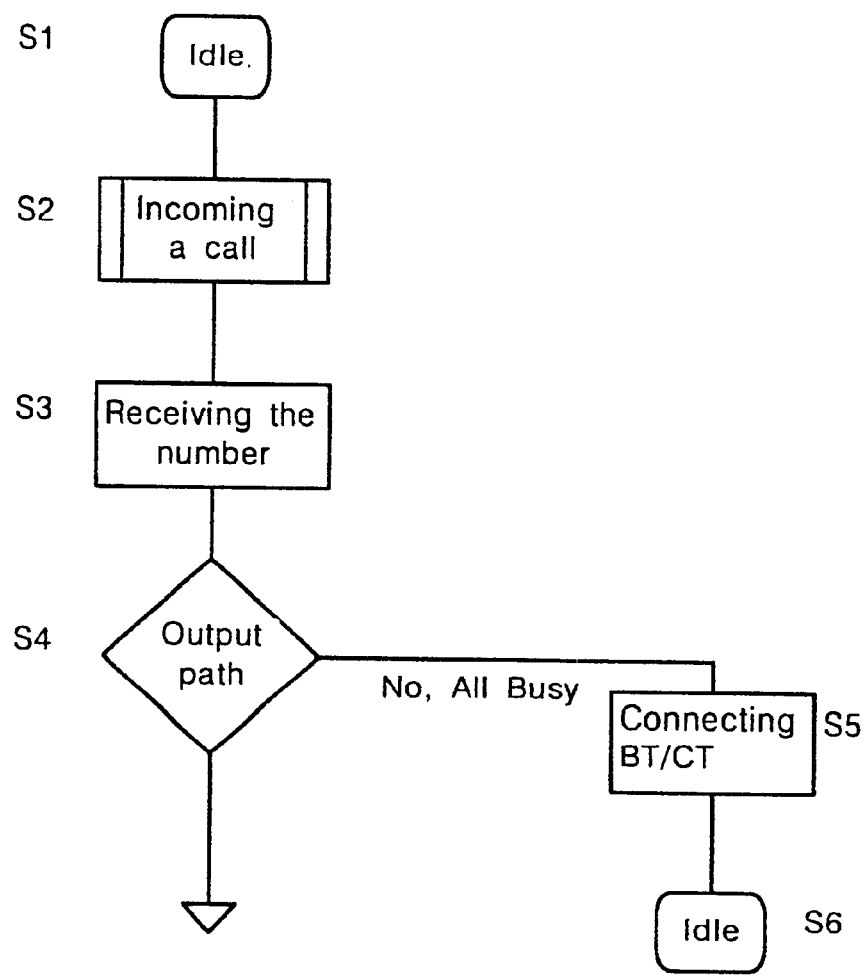
FIG. 17 is a flow chart for a BT/CT connection in FIG. 16.

FIGS. 14A and 14B show an other embodiment for changing and controlling a timing of sending a BT/CT signal according to the present invention, and show a mode when employing a common channel No. 7 signaling method in a network, such as ISDN.

When employing a common channel No. 7 signaling method, a common channel signaling path is connected to an exchange 1 through a data terminal (DT) 3 apart from a communication path.

The data terminals (DT) 3 are corresponding to a first physical layer of seven layers. The exchange 1 includes a common channel signaling equipment (CSE) 2 corresponding to a data link layer shown in FIG. 14B.

A common channel signaling equipment (CSE) 2 includes transmitting and receiving buffers 20 and 21. The equipment 2 can judge congestion levels according to levels accumulated in each links of transmitting and receiving buffers 20 and 21. Therefore, the congestion levels in each links of the transmitting and receiving buffers 20 and 21 are transmitted to a network layer 22 corresponding to the third layer.

The levels are compared with a predetermined threshold in the network layer 22, and then, a congestion status is judged in each link. The result is informed to an upper level of application layer 23. Therefore, a timing of sending a BT/CT signal is changed and controlled with respect to links, which are in a congestion status, as described above, according to the application layer 23.

mAs explained according to the embodiments in accompanying with the attached drawings, it becomes possible to prevent from repeating to send callings in a short time by controlling so as to delay a timing of sending a congestion tone (CT) or busy tone in a call congestion status.

Thereby, it becomes possible to relieve the call congestion status. It becomes possible to maintain a quality of a connection service for communication, similarly in a normal status, and flexibly relieve the congestion status.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A congestion control method, comprising the steps of:
   generating a call pattern as time series data of calls from a subscriber;
   performing Fast Fourier transformation on the time series data of the calls to detect short periodic component of a frequency;
   delaying the detected short periodical component with a prescribed threshold; and
   delaying a timing of sending a congestion tone (CT) or busy tone (BT) when the value of the short periodical component exceeds the prescribed threshold.

2. A congestion control method, comprising the steps of:
   counting calls from subscribers in each prescribed channels;
   obtaining an amount of calls in certain interval from the counted number of the calls; and
   delaying a timing of sending a congestion tone (CT) or busy tone (BT) when the amount of calls in certain interval exceeds a predetermined threshold.

3. In an exchange system employing a common channel No. 7 signaling method, a congestion control method comprising the steps of:
   obtaining each levels accumulated in buffers of common channel signaling equipment; and
   delaying a timing of sending congestion tone (CT) or busy tone (BT) when the accumulated levels exceed a prescribed threshold.

4. The congestion control method according to claim 1, wherein subscribers are grouped according to a prescribed standard for changing and controlling so as to delay a timing of sending a congestion tone (CT) or busy tone (BT) in every grouped group.

5. The congestion control method according to claim 2, wherein subscribers are grouped according to a prescribed standard for changing and controlling so as to delay a timing of sending a congestion tone (CT) or busy tone (BT) in every grouped group.

6. The congestion control method according to claim 3, wherein subscribers are grouped according to a prescribed standard for changing and controlling so as to delay a timing of sending a congestion tone (CT) or busy tone (BT) in every grouped group.

7. The congestion control method according to claim 1, wherein subscribers are grouped according to a prescribed standard for changing and controlling so as to delay a timing of sending a congestion tone (CT) or busy tone (BT) to a subscriber joined in a specific one of the grouped groups.

8. The congestion control method according to claim 2, wherein subscribers are grouped according to a prescribed standard for changing and controlling so as to delay timing of sending a congestion tone (CT) or busy tone (BT) to a subscriber joined in a specific one of the grouped groups.

9. The congestion control method according to claim 3, wherein subscribers are grouped according to a prescribed standard for changing and controlling so as to delay a timing of sending a congestion tone (CT) or busy tone (BT) to a subscriber joined in a specific one of the grouped groups.

10. The congestion control method according to claim 4, wherein the grouping is performed by transforming subscriber numbers into a hash function.

11. The congestion control method according to claim 5, wherein the grouping is performed by transforming subscriber numbers into a hash function.

12. The congestion control method according to claim 4, wherein the grouping is performed according to a terminal number of the subscriber number.

13. The congestion control method according to claim 5, wherein the grouping is performed according to a terminal number of the subscriber number.

14. The congestion control method according to claim 4, wherein the grouping is performed according to an attribute of the subscriber number.

15. The congestion control method according to claim 5, wherein the grouping is performed according to an attribute of the subscriber number.

16. A congestion control system in an exchange, including the exchange including a line controller, switching sections, and a main controller,
   wherein the line controller includes a line switch, a line processor and a traffic counter for counting every call sent from a subscriber and the line processor generates time series data according to incoming call data counted in the traffic counter, perform Fast Fourier transformation on the time series data of the calls, detects a value of short periodical component of a frequency, compares the detected value of the short periodical component with a prescribed threshold, and controls to delay a timing of sending a congestion tone (CT) or busy tone (BT) when the value of the short periodical component exceeds the prescribed threshold.

17. A congestion control system in an exchange, including a line controller, switching sections, and a main controller,
   wherein the line controller includes a line switch, a line processor and a traffic counter for counting every call sent from a subscriber and the line processor changes and controls so as to obtain an amount of calls in certain interval according to the number of the counted calls and delay a timing of sending a congestion tone (CT) or busy tone (BT) when the amount of calls in certain interval exceeds a prescribed threshold.

18. An exchange system employing a common channel No. 7 signaling method, comprising:
   a common channel signaling equipment including buffers;
   a network layer for detecting a congestion status when the levels of the buffers exceed a prescribed threshold; and an application layer for delaying a timing of sending a congestion tone (CT) or busy tone (BT) when detecting a congestion status in the network layer.

19. The congestion control system according to claim 16, wherein subscribers are grouped according to a prescribed standard, and the traffic counter is provided in each of the grouped groups.

20. The congestion control system according to claim 17, wherein subscribers are grouped according to a prescribed standard, and the counter is provided in each of the grouped groups.

21. The exchange system according to claim 18, wherein the line processor controls so as to delay a timing of sending a congestion tone (CT) or busy tone (BT) to a subscriber in a specific one of the grouped groups.

22. The congestion control system according to claim 19, wherein the line processor controls so as to delay a timing of sending a congestion tone (CT) or busy tone (BT) to a subscriber in a specific one of the grouped groups.

23. The congestion control system according to claim 20, wherein the line processor controls so as to delay a timing of sending a congestion tone (CT) or busy tone (BT) to a subscriber in a specific one of the grouped groups.

24. The exchange system according to claim 18, wherein the grouping is performed by transforming subscriber numbers into a hush function.

25. The congestion control system according to claim 19, wherein the grouping is performed by transforming subscriber numbers into a hush function.

26. The congestion control system according to claim 20, wherein the grouping is performed by transforming subscriber numbers into a hush function.

27. The exchange system according to claim 18, wherein the grouping is performed in accordance to a terminal number of each subscriber number.

28. The congestion control system according to claim 19, wherein the grouping is performed in accordance to a terminal number of each subscriber number.

29. The congestion control system according to claim 20, wherein the grouping is performed in accordance to a terminal number of each subscriber number.

30. The exchange system according to claim 18, wherein the grouping is performed in accordance to an attribute of each subscriber number.

31. The congestion control system according to claim 26, wherein the grouping is performed in accordance to an attribute of each subscriber number.

32. The congestion control system according to claim 20, wherein the grouping is performed in accordance to an attribute of each subscriber number.

* * * * *